(12) United States Patent
Endo et al.

(10) Patent No.: US 6,506,514 B1
(45) Date of Patent: Jan. 14, 2003

(54) NONAQUEOUS ELECTROLYTE SECONDARY BATTERY

(75) Inventors: Takayuki Endo, Utsunomiya (JP); Hiroshi Watanuki, Utsunomiya (JP)

(73) Assignee: NEC Mobile Energy Corporation, Utsunomiya (JP)

( * ) Notice: Subject to any disclaimer, the term of this patent is extended or adjusted under 35 U.S.C. 154(b) by 88 days.

(21) Appl. No.: 09/721,712

(22) Filed: Nov. 27, 2000

(30) Foreign Application Priority Data

Nov. 25, 1999 (JP) .......................................... 11-333647

(51) Int. Cl.[7] .......................... H01M 4/00; H01M 6/10; H01M 2/18; H01M 2/02; H01M 6/08
(52) U.S. Cl. .......................... 429/94; 429/130; 429/164
(58) Field of Search ........................... 429/94, 130, 164

(56) References Cited

U.S. PATENT DOCUMENTS

| | | | |
|---|---|---|---|
| 4,707,421 A | * 11/1987 | McVeigh et al. | 429/164 |
| 5,288,564 A | * 2/1994 | Klein et al. | 429/119 |
| 5,603,737 A | * 2/1997 | Marincic et al. | 29/623.1 |
| 5,658,683 A | * 8/1997 | Kageyama et al. | 29/623.1 |
| 5,667,907 A | * 9/1997 | Audit et al. | 180/65.1 |
| 5,834,133 A | * 11/1998 | Narukawa et al. | 429/169 |
| 6,083,640 A | * 7/2000 | Lee et al. | 429/161 |
| 6,284,408 B1 | * 9/2001 | Akazawa et al. | 429/211 |

FOREIGN PATENT DOCUMENTS

| | | | | |
|---|---|---|---|---|
| GB | 2122413 | * | 6/1983 | ............ H01M/6/14 |
| JP | 6-150971 | | 5/1994 | |
| JP | 06-150971 | * | 5/1994 | .......... H01M/10/40 |
| JP | 7-142089 | | 6/1995 | |
| JP | 8-339817 | | 12/1996 | |

* cited by examiner

*Primary Examiner*—Patrick Ryan
*Assistant Examiner*—Donald V. Scaltrito
(74) *Attorney, Agent, or Firm*—Armstrong, Westerman & Hattori, LLP

(57) ABSTRACT

The present invention provides a nonaqueous electrolyte secondary battery, comprising a battery element produced by laminating and winding up a positive electrode and a negative electrode with a separator interposed therebetween. A separator is not provided on the outermost periphery of the battery element. A current collector surface of one of the positive electrode or the negative electrode is exposed to the ambient environment. A separation-preventive tape is attached on the battery element except a portion of one of the longer sides on the outermost periphery. This battery increases battery capacity of the thin-walled type nonaqueous electrolyte secondary battery.

2 Claims, 3 Drawing Sheets

(A)

(B)

(C)

NONAQUEOUS ELECTROLYTE SECONDARY BATTERY

BACKGROUND OF THE INVENTION

The present invention relates to a nonaqueous electrolyte secondary battery, and in particular, to a nonaqueous electrolyte secondary battery with a rectangular type battery case.

Various types of batteries are now used as power source for small-size electronic devices. As power source for the devices such as cellphone (handy phone), notebook-sized personal computer, cam-corder, etc., nonaqueous electrolyte secondary battery is used. These nonaqueous electrolyte batteries can be cylindrical type batteries or rectangular type batteries.

To prepare a lithium ion battery as a power source for small-size electronic devices, a positive electrode and a negative electrode are produced by coating active components on a positive electrode current collector and a negative electrode current collector, respectively. These electrodes are laminated on each other with a separator interposed between them, and they are wound up, and a battery element is prepared. This battery element is accommodated in a battery case and is sealed to be used as a sealed battery.

These batteries can be cylindrical type batteries and rectangular type batteries. A cylindrical type battery is produced by accommodating a battery element wound up in cylindrical shape into a cylindrical battery case. The rectangular type battery is produced by accommodating the battery element into a battery case in the shape other than cylindrical shape, e.g. in from of rectangular parallelepiped.

In the cylindrical type battery, the battery element is designed in cylindrical shape. When it is accommodated in the battery case, the force is evenly applied on the battery element, and battery reaction also occurs evenly without being deviated to a specific point.

However, the devices such as notebook-size personal computer, cellphone, etc. where the batteries are used, are usually designed in form of rectangular parallelepiped. In this type of battery accommodating compartment, there is a problem in that ineffective or useless volume is increased in the cylindrical battery because the diameter of the cylindrical type battery is limited by the thickness of the battery accommodating compartment. Problem may arise in that it is not possible to use a cylindrical type battery of large capacity for a thin-walled type devices. In this respect, for small-size or thin-walled type devices, a rectangular type battery with smaller thickness is used instead of a cylindrical type battery.

FIG. 3 shows a conventional type nonaqueous electrolyte secondary battery. FIG. 3(A) is a side view of a battery element for a rectangular type battery, and FIG. 3(B) is a plan view of a battery element for a rectangular type battery. FIG. 3(C) is a plan view of a rectangular type battery case with the battery element accommodated in it as seen from above.

On a material containing iron as main component, a nickel-plated layer is formed, and this is used as a battery case of a nonaqueous electrolyte secondary battery 1. In the battery case 2, a battery element 3 is accommodated, which is produced by winding up a positive electrode with a positive electrode active component coated on it and a negative electrode with negative electrode active component coated on it with a separator interposed between them. A positive electrode tab 4 is mounted on the positive electrode, and a negative electrode tab 5 is mounted on the negative electrode.

In general, belt-like members are laminated on each other in the order of positive electrode—separator—negative electrode—separator. Using a winding device, the negative electrode is wound up on outer side, and a separation—preventive tape 7 is used to fix the separator surface on the outermost periphery and to prevent partial separation of the battery element. Then, the battery element is accommodated in the battery case 2.

The separator on the outermost periphery protects the battery element. It is also used for the purpose of improving the sliding performance between the battery element and inner surface of metal material such as aluminum, stainless steel, or nickel-plated soft steel used as the battery case. Further, it is used for the purpose of facilitating the insertion of the battery element or of preventing deformation of the wound-up battery element, just as the separation of outer shell of a bamboo shoot, due to the friction with the inner surface of the battery case.

However, the separator on the outermost layer is originally not required, and, when it is used, it adds additional ineffective thickness to the battery element. In the thin-walled battery used in recent years, the thickness of the separator on battery capacity gives increasingly more serious influence.

For instance, in case of a lithium ion secondary battery of 4 mm in thickness, a battery element of about 3.2 mm in thickness is used. The separators each of 0.05 mm in thickness arranged on each side on outer periphery occupy about 3% of the total volume of the battery element The rectangular type lithium ion secondary batteries are also used in small-size devices, and there are now strong demands on the reduction of battery volume and on the increase of battery capacity. Therefore, the reduction or elimination of the portions not contributing to the battery capacity in the battery is very important to increase the battery capacity.

It is an object of the present invention to provide a rectangular type lithium ion secondary battery, by which it is possible to reduce or eliminate the portions not contributing to the battery reaction of the battery element, and to provide a rectangular type nonaqueous electrolyte secondary battery, which has smaller thickness and larger capacity and has a battery element stable in form and easy to assemble.

SUMMARY OF THE INVENTION

The present invention provides a nonaqueous electrolyte secondary battery, comprising a battery element produced by laminating and winding up a positive electrode and a negative electrode with a separator interposed therebetween, a separator is not provided on the outermost periphery of the battery element, a current collector surface of one of the positive electrode or the negative electrode is exposed to outside, and a separation-preventive tape is attached on the battery element except a part of one of the longer sides on the outermost periphery.

DESCRIPTION OF THE PREFERRED EMBODIMENT

According to the present invention, when a battery element of a nonaqueous electrolyte secondary battery is produced, each of current collectors of an electrode of the same polarity as that of a battery case is exposed to outside on the outermost periphery, and a separator is not used on the outermost periphery.

Then, a separation-preventive tape larger than the tape normally used for the battery element is wound, and this makes it possible to prevent the partial separation of the wound-up battery element and to smoothly insert the battery element into the battery case. As a result, it is possible to have a battery element with smaller thickness and to increase the capacity of a thin-walled type battery.

In the following, description will be given on the present invention referring to the attached drawings.

Figure 1:
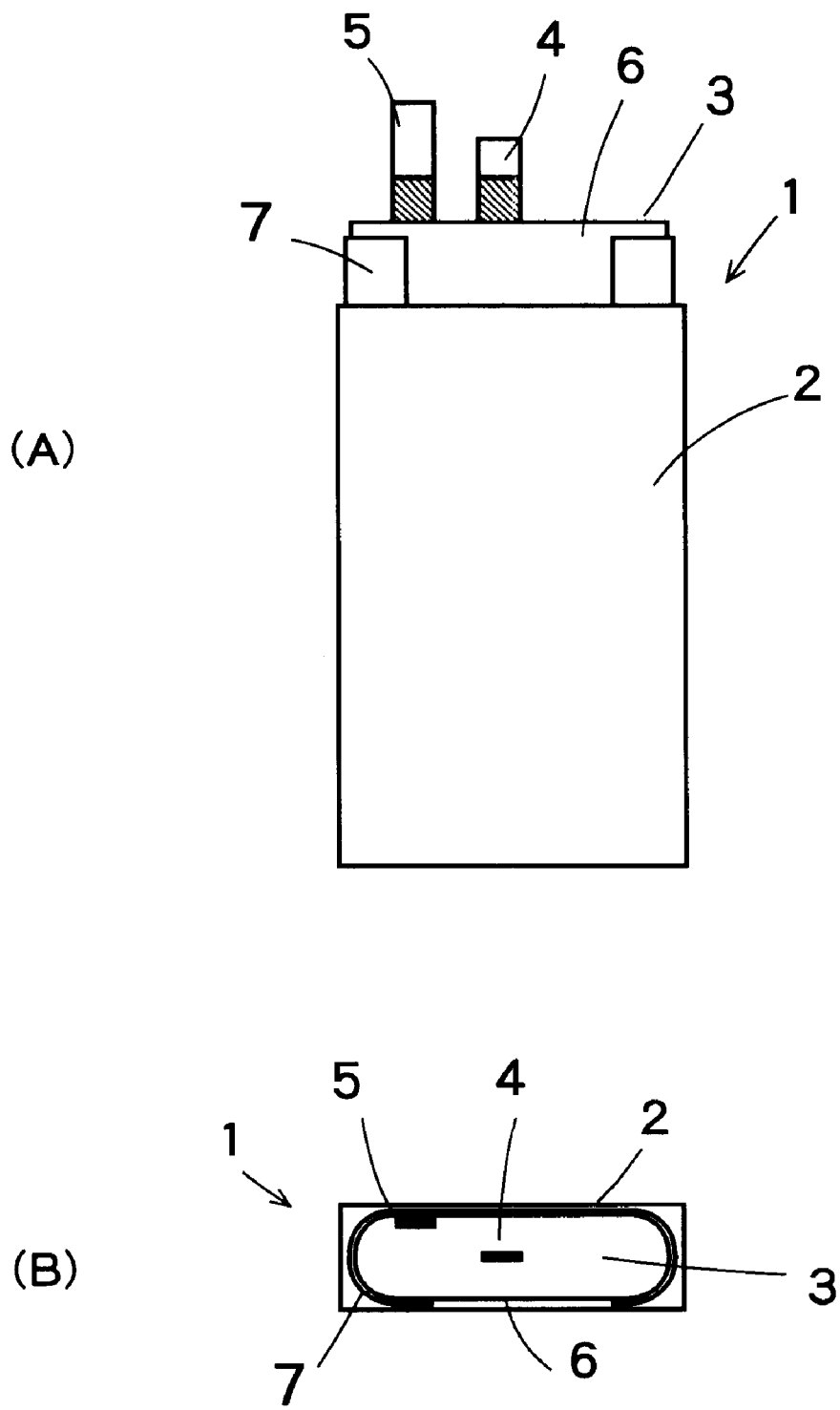
FIG. 1 shows an example of a nonaqueous electrolyte secondary battery of the present invention.

FIG. 1 shows an example of a nonaqueous electrolyte secondary battery according to the present invention. FIG. 1(A) is a side view of a rectangular type battery case with a part of a battery element accommodated in it, and FIG. 1(B) is a plan view of a battery case of a battery with the battery element accommodated in it and with a top cover not mounted on it.

In a battery case 2 of a sealed battery 1 of the present invention, a battery element 3 is accommodated. On the top of the battery element 3, a positive electrode tab 4 and a negative electrode tab 5 for current collection are provided. On the outermost periphery of the battery element 3, a current collector surface 6 with electrode active component not coated on it is provided. On the current collector surface 6, except a part of one of the longer sides, a separation-preventive tape 7 is attached for preventing partial separation of the wound-up battery element and for reducing friction when the battery element is accommodated into the battery case. This makes it possible to prevent partial separation of the battery element, which occurs just like the separation of outer shell of a bamboo shoot, when the battery element is placed into the battery case. It is also possible to overcome the difficulty due to friction with the inner side of the battery case when the battery element is accommodated into the battery case and to prevent damage of the battery element caused by such friction.

Figure 2:
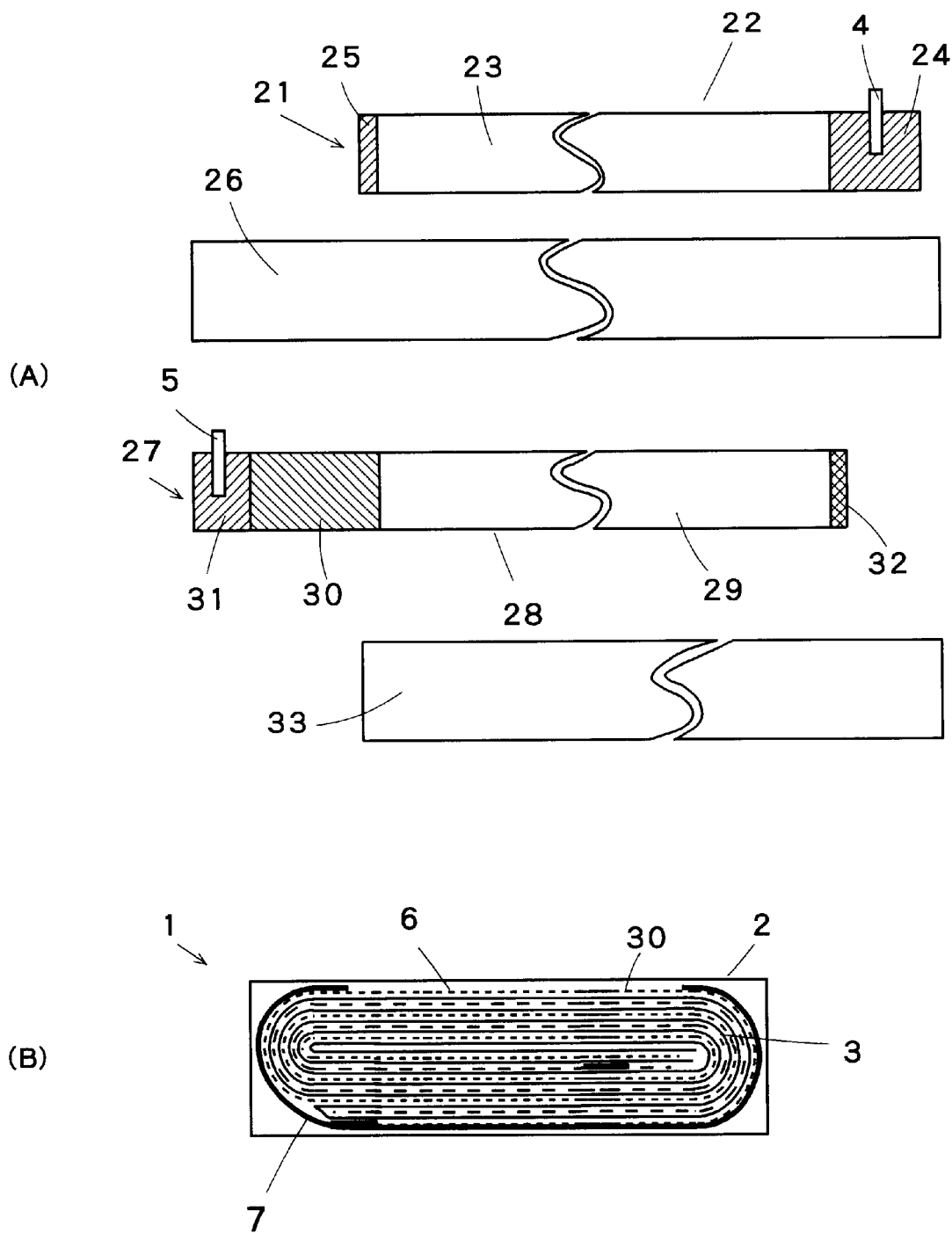
FIG. 2 shows another example of a nonaqueous electrolyte secondary battery of the present invention.
Figure 3:
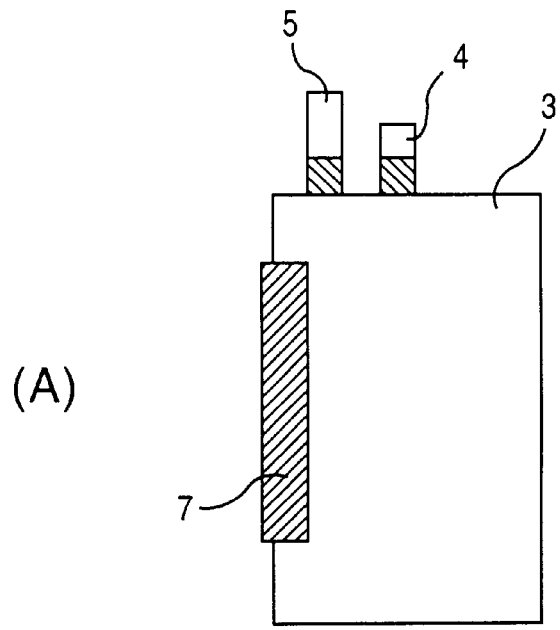
FIG. 3 shows an example of a conventional type nonaqueous electrolyte secondary battery.
Figure 3:
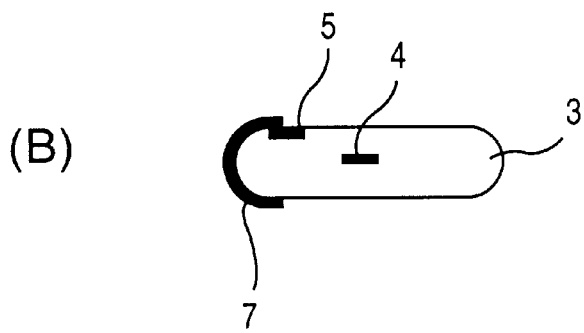
Figure 3:
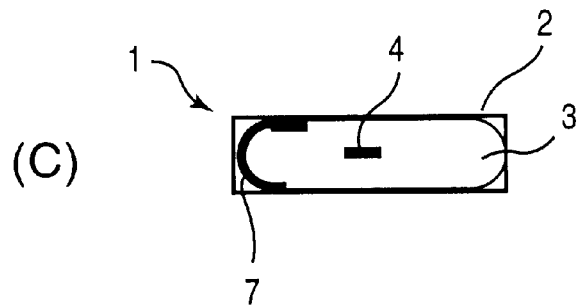

FIG. 2 shows another example of the battery of the present invention. FIG. 2(A) represents development plans, each showing a positive electrode and a negative electrode each in belt-like shape, and a separator (the central portion is not shown in each case), and FIG. 2(B) is a cross-sectional view of the battery.

On a positive electrode 21, a positive electrode active component coated portion 23 where a positive electrode active component is coated is formed on each surface of a belt-like positive electrode current collector 22 made of a material such as aluminum. On each end in longitudinal direction of the positive electrode, positive electrode active component non-coated portions 24 and 25 where positive electrode active component is not coated are provided respectively. The positive electrode active component non-coated portion 24 is positioned on a winding core when the positive and the negative electrodes are laminated on each other with a first separator 26 interposed between them and are wound up. A positive electrode tab 4 is provided, which is electrically connected to the positive electrode 21 and an external connecting terminal on the battery case. Also, on a negative electrode 27, a negative electrode active component coated portion 29 to match the positive electrode active component coated portion 28 is arranged on a negative electrode current collector 28 made of a copper foil. On a negative electrode current collector positioned on outer periphery, a negative electrode active component one-side coated portion 30 where the negative electrode active component is coated only on one side and a negative electrode active component non-coated portion 31 where the negative electrode active component is not coated are provided. On the negative electrode active component non-coated portion 31, a negative electrode tab 5 is mounted.

In order to prevent the deposition of metal lithium to an end of the winding core of the negative electrode 27, a first separator 26 is arranged on an end 32 closer to the winding core of the negative electrode and is extended beyond the positive electrode active component coated portion 23. On the negative electrode active component one-side coated portion 30 and the negative electrode active component non-coated portion 31 on the outermost periphery of the battery element, a second separator 33 is arranged in such a length that the negative electrode active component non-coated portion 31 is exposed to the outermost periphery of the battery element and it is extended beyond the positive electrode active component coated portion 23, and these are laminated on each other and are wound up.

On the battery element 3 thus wound up, as shown FIG. 2(B), a separation-preventive tape 7 is attached on the current collector surface 6, which comprises the negative electrode active component one-side coated portion 30, except a part of one longer side of the battery element. Then, the battery element is accommodated in the battery case. The separation-preventive tape 7 can provide an effect to reduce the volume of the battery element compared with the case the separator is used on the outermost periphery when the battery element is attached on the entire surface. As shown in FIG. 1 or FIG. 2(B), when the separation-preventive tape is attached except a part of one longer side of the battery element, i.e. except the central portion on the surface on the longer side, higher effect can be attained to reduce the volume of the battery element.

The separation-preventive tape covers one of the longer sides and both of the two shorter sides, and it is possible to overcome and eliminate such problems that it is difficult to insert the battery element into the battery case due to friction on wall surface of the battery case, or that the battery element may be damaged.

In the battery of the present invention, as a material to be used for preventing partial separation of the battery element and for reducing the friction, an adhesive tape made of polyimide or polypropyrene may be used for preventing the separation of a part of the battery element from the base material.

In case of a battery element with thickness of about 3.2 mm used in a thin-type lithium ion secondary battery of 4 mm in thickness, the capacity of the battery can be improved by about 6% when a separator of 0.1 mm in thickness is not used on the outermost periphery.

The separator is not provided on the outermost periphery of the battery element, which comprises belt-like positive electrode and negative electrode wound up with a separator interposed between them. As a result, compared with the conventional type battery, battery capacity can be increased by an amount corresponding to the thickness of the separator, and battery capacity can be increased in a thin-walled type lithium ion secondary battery.

What is claimed is:

1. A nonaqueous electrolyte battery, comprising:

a battery element produced by laminating and winding only a positive electrode and a negative electrode with a separator interposed therebetween, but without a separator on an outermost periphery of the battery element;

a current collector surface of the positive electrode is exposed to an ambient environment when the battery case is the positive electrode, a current collector surface of the negative electrode is exposed to an ambient environment when the battery case is the negative electrode, and a separation-preventive tape is attached on the battery element except a linear portion of one of the longer sides on the outermost periphery.

2. A nonaqueous electrolyte battery according to claim 1, wherein said battery is a lithium ion battery.

* * * * *